Aug. 7, 1928.

W. E. GLANCY 1,679,657

BATTERY BOX

Filed March 15, 1927

Inventor

WARREN E. GLANCY,

By Spear Middleton Donaldson & Hall

Attorneys

Patented Aug. 7, 1928.

1,679,657

UNITED STATES PATENT OFFICE.

WARREN E. GLANCY, OF WALTHAM, MASSACHUSETTS.

BATTERY BOX.

Application filed March 15, 1927. Serial No. 175,590.

My invention relates more particularly to battery boxes of the type which are made of a molded asphaltic composition and aims to provide a box of this character having means by which it may be readily engaged by a bail handle to enable it to be removed, replaced and transported, and which means will not be liable to be pulled out of the box, which will prevent all danger of the cracking of the box, and which will be free from the detrimental effect of any acid which may be spilt onto the same.

The invention includes the novel construction hereinafter described and defined by the appended claims.

An embodiment of the invention is illustrated in the accompanying drawing in which:—

Figure 1:
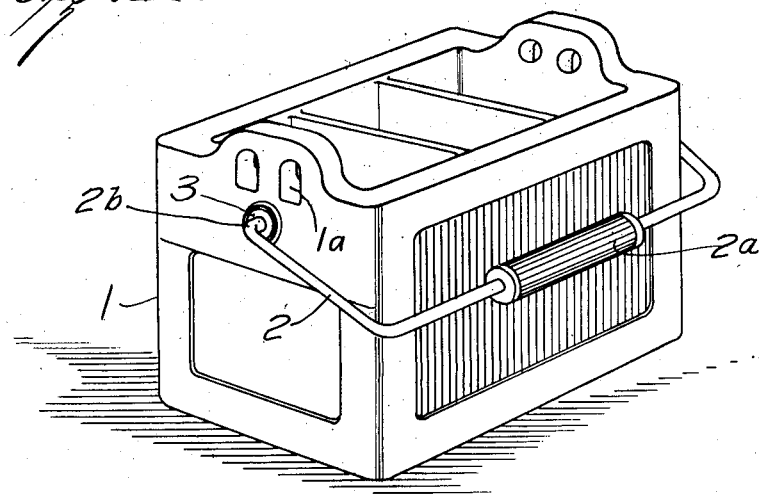
Figure 1 is a perspective view of a box embodying my invention.
Figure 2:
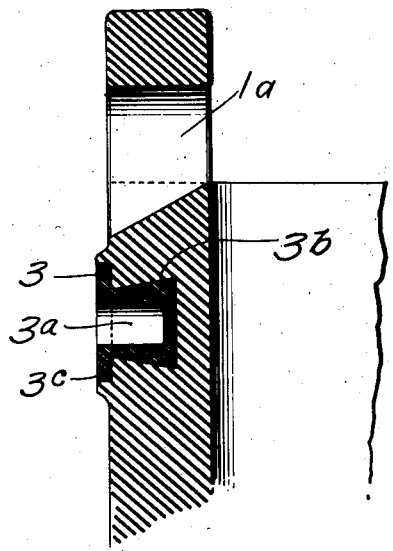
Fig. 2 is a sectional detail.

Referring by reference characters to this drawing the numeral 1 indicates a battery box of the customary form and made of the usual asphaltic composition well known to the trade and which is molded when hot with pressure to the desired shape in suitable molds or dies. This battery box is shown provided with the usual finger hold portions 1ª, but it is desirable to provide means by which it may be engaged by a metal bail 2 having a hand grasp portion 2ª by which it may be readily lifted by one hand to enable it to be removed from its position of use such as in a motor vehicle, transported and replaced, which bail is of course removable to enable it to be successively used with different battery boxes.

Owing to the nature of the asphaltic composition, attempt to have the hooked or angularly turned ends 2ᵇ of the bail engage mere openings or recesses in the end walls of the box was found unsatisfactory, the stock lacking sufficient strength which resulted in the bails pulling out of the stock and injuring it to such an extent that it could not be thereafter lifted or transported by the bail and in some cases damaging the box beyond capacity for further use.

In order to avoid these objections I provide each end of the battery box with a grommet 3 which is formed of a hard rubber composition having fiber (preferably textile) incorporated therein, which is vulcanized to the consistency of hard rubber before being embedded in the box wall. This grommet is provided with a cylindrical opening 3ª for the reception of the bail end which opening is closed at its inner end. The grommet preferably has its body portion formed to interlock with the plastic material of the box which interlock may be accomplished by making said body portion of inwardly flaring form or truncated cone shape as indicated at 3ᵇ. The grommet further is preferably provided with an integral annular enlargement or flange 3ᶜ flushed with the face thereof. In practice the mold walls which form the end walls of the box are provided with pegs or projections on which the grommets are placed, the said projections engaging the holes or recesses in the grommets whereafter the asphaltic material is molded into box form so that the grommets are embedded in the box walls as shown in Figure 1.

I have found that such a grommet in the course of manufacture of the box becomes firmly united to the material thereof, and cannot easily be pulled loose therefrom while at the same time it affords sufficient strength to receive the strain and wear of the bail end without danger of cracking and furthermore it is free from the detrimental effects of any acid which may slop over in the use of the battery.

Figure 3:
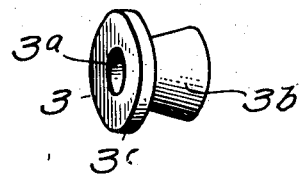
Fig. 3 is a perspective view of the grommet before its incorporation in the box and, Fig. 4 is a view similar to Fig. 3 but showing a modification.
Figure 4:
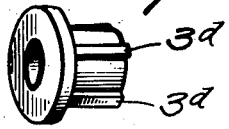

Instead of making the body portion of the grommet of truncated cone shape as shown in Fig. 3 to secure the interlock it may be provided with ribs or projections 3ᵈ as shown in Fig. 4.

Having thus described my invention, what I claim is:

1. A battery box of molded asphaltic composition having embedded in each end wall thereof a bail receiving grommet composed of hard rubber and fiber.

2. A battery box of molded asphaltic composition having embedded in each wall thereof a grommet composed of hard rubber and fiber, said grommet having a bail receiving recess provided with a closed bottom.

3. A battery box of molded asphaltic composition having embedded in each end wall thereof a bail receiving grommet, said grommet having one or more parts in interlocking engagement with the box wall.

In testimony whereof, I affix my signature.

WARREN E. GLANCY.